United States Patent
Hoichman (10) Patent No.: US 7,969,886 B1
(45) Date of Patent: Jun. 28, 2011

(54) BANDWIDTH ALLOCATION FOR HIERARCHICAL TELECOMMUNICATIONS NETWORKS

(75) Inventor: Michael Hoichman, Modi'in (IL)

(73) Assignee: Tejas Israel Ltd, Herzelia Pituach (IL)

( * ) Notice: Subject to any disclaimer, the term of this patent is extended or adjusted under 35 U.S.C. 154(b) by 186 days.

(21) Appl. No.: 12/334,555

(22) Filed: Dec. 15, 2008

(51) Int. Cl.
*H04L 12/26* (2006.01)

(52) U.S. Cl. ........ 370/235; 370/229; 370/230; 370/241; 370/252

(58) Field of Classification Search .................. 370/229, 370/230, 235, 241, 252
See application file for complete search history.

(56) References Cited

U.S. PATENT DOCUMENTS

| | | | |
|---|---|---|---|
| 2004/0252714 A1* | 12/2004 | Oh et al. | 370/437 |
| 2006/0245356 A1* | 11/2006 | Porat et al. | 370/232 |
| 2009/0161669 A1* | 6/2009 | Bragg et al. | 370/389 |

* cited by examiner

*Primary Examiner* — Hassan Kizou
*Assistant Examiner* — Siming Liu
(74) *Attorney, Agent, or Firm* — Deborah Gador (57) ABSTRACT

A method and system for bandwidth allocation over a hierarchical telecommunications network having a first hierarchical level of at least two trunks and a second hierarchical level of at least two flows in each trunk, the method including allocating bandwidth to each of the trunks; and separately allocating the bandwidth allocated to each trunk to the flows in that trunk.

20 Claims, 7 Drawing Sheets

BANDWIDTH ALLOCATION FOR HIERARCHICAL TELECOMMUNICATIONS NETWORKS

FIELD OF THE INVENTION

The present invention relates to hierarchical telecommunications networks, in general and, in particular, to a method and system for allocating bandwidth in such networks.

BACKGROUND OF THE INVENTION

A flat telecommunications network is a network in which all network entities communicate with each other without going through any intermediary hardware devices, such as a bridge or router. A flat network is one network segment, where each network entity can access the others using the datalink layer. A flat network topology is adequate for very small networks. With a flat network design, there is no hierarchy. Each network device has essentially the same function, and the network is not divided into layers or modules. A flat network topology is easy to design and implement, and it is easy to maintain, as long as the network stays small. When the network grows, however, a flat network is impractical.

Large networks are segmented into broadcast domains to contain broadcast traffic and to improve performance. A segmented network (that includes a few broadcast domains) has a hierarchy of layers. A hierarchical network has a topology of discrete layers. Each layer can be focused on specific functions, allowing the designer to choose the right systems and features for the layer.

For purposes of the present invention, a hierarchical network includes a layer of services or flows which can be grouped into a higher layer of trunks. The term trunks, as used herein, includes also tunnels, trails, and any other similar grouping of services or flows for routing purposes. The term flows will be used herein to also include services.

A typical hierarchical topology model consists of a core layer of routers and switches, that are optimized for availability and performance, and an access layer, that connects users via lower-end switches and wireless access points. A network core is the central part of a telecom network that provides various services to customers who are connected by the access network. Connections of devices in a core layer are associated with tunnels. Tunneling is a technique for connecting two networks via a third transit network. The two networks send their data via the third network's connections. Tunneling works by encapsulating a network protocol within packets carried by the third network.

A flow is an end-to-end connection between devices in the same access network or between devices in different access networks. Each flow is associated with specific source and destination and QoS (Quality of Service) requirements. All the flows in a tunnel follow the same path in the network, where a path is a set of links. Therefore, a tunnel determines the path of a flow in the network topology. In case a flow connects devices in different access networks, the packets associated with the flow enter the core network while encapsulated into a tunnel. All the services in the core network are provisioned in the tunnel. Each edge device may be an endpoint of flows that follow different network paths and, therefore, are in different tunnels. It will be appreciated that the number of flows is significantly higher than the number of paths that are used by those flows.

One example of a hierarchical network is the Provider Backbone Bridged Network (PBBN) defined in IEEE 802.1ah standard. A new technology called Provider Backbone Transport (PBT) can be employed within the service domain of PBBN to allow configuration of Ethernet trunks facilitating guaranteed QoS. The services are provisioned inside a trunk. Thus, the network is not flat, but there is a level of trunks, and each trunk aggregates a set of services inside.

Another example is a new recommendation by the International Telecommunication Union (ITU) Standardization Sector for Transport Multi Protocol Label Switching (T-MPLS) layer network. The T-MPLS layer network provides the transport of information through a T-MPLS trail between T-MPLS access points. Here, also, there is a hierarchy of sub layers.

U.S. patent application Ser. No. 11/346,147, to the same Applicant, entitled "Admission Control for Telecommunications Networks" (ACTN), describes a method and a system for admission control for telecommunications networks. The ACTN exemplary embodiment suggests a single dynamic bandwidth allocation algorithm, preferably running on each proprietary edge device, for allocating bandwidth to all flows in the network, based on global traffic statistics, by calculating a bandwidth available for best effort from the total available bandwidth and provisioned committed bandwidth of the network, and allocating the bandwidth available for best effort between the flows in the network substantially proportionally to provisioned best effort bandwidth.

Networks consistently grow and the number of services or flows in a network increases rapidly. Therefore, admission control methods that are based on services or flows, only, are limited, as they do not scale well to the hierarchical model. Therefore, it would be desirable to have an admission control and bandwidth allocation method for hierarchical networks that is scalable and based on a hierarchical model.

SUMMARY OF THE INVENTION

According to the present invention, in order to provide efficient bandwidth allocation in a hierarchical network, admission control is performed on two levels: bandwidth allocation to trunks in a network and bandwidth allocation to flows inside each trunk.

There is thus provided according to the present invention a method for bandwidth allocation over a hierarchical telecommunications network having a first hierarchical level of at least two trunks and a second hierarchical level of at least two flows in each trunk, the method including allocating bandwidth to the trunks and separately allocating the bandwidth allocated to each trunk to the flows in that trunk. According to a preferred embodiment of the invention, the steps of allocating bandwidth include allocating Committed Information Rate (CIR) bandwidth, in accordance with input provisioning data, calculating a difference between total available bandwidth and the CIR bandwidth, and allocating the difference as Excess Information Rate (EIR) bandwidth in accordance with the provisioning data.

In one exemplary embodiment of the current invention, the method is implemented in a packet switching network, i.e., an Ethernet network.

In an alternative embodiment, the method is deployed in a T-MPLS layer network. In this case, also, bandwidth allocation is carried out on different levels of the hierarchy, i.e., the bandwidth allocation is carried out for each T-MPLS trail, while the bandwidth allocation of services inside a trail is carried out separately.

According to another embodiment, the method can be deployed in a PBT network. Here, the bandwidth allocation for each tunnel can be performed on one level of admission control, while the bandwidth allocation of services inside the tunnels can be performed on another level of admission control.

BRIEF DESCRIPTION OF THE DRAWINGS

The present invention will be further understood and appreciated from the following detailed description taken in conjunction with the drawings in which.

DETAILED DESCRIPTION OF EXEMPLARY EMBODIMENTS OF THE INVENTION

The present invention relates to an admission control (bandwidth allocation) method for achieving Quality of Service (QoS) guarantees set out in Service Level Agreements (SLAs) for customers in a hierarchical telecommunications network. For purposes of the present application, hierarchical refers to a network having at least two levels for routing, wherein each routing element in the higher level (for example, a tunnel in an Ethernet network) provides routing for a group of elements from the lower level (e.g., flows). This is accomplished by dynamically adjusting rate controls and access to the network by allocating bandwidth between all the routing elements in the higher level of the network (herein referred to as "trunks") and then allocating bandwidth to the elements in each routing element, individually (herein referred to as "flows"). This allocation is based on knowledge of global network topology and network utilization, together with actual identified traffic bandwidth demands of each flow and the bandwidth allocations granted for each flow. This method also maximizes network utilization by using these dynamic rate controls. Thus, an exemplary method is proposed including an algorithm that uses network statistics in order to dynamically control the ingress traffic rate in such a way that the total amount of traffic entering the network is controlled, and bandwidth, bound jitter and delay are assured according to the SLAs between service providers and their customers. The exemplary method is illustrated on an exemplary hierarchical network, which has two levels of network topology and is operated by tunneling techniques.

Figure 1:
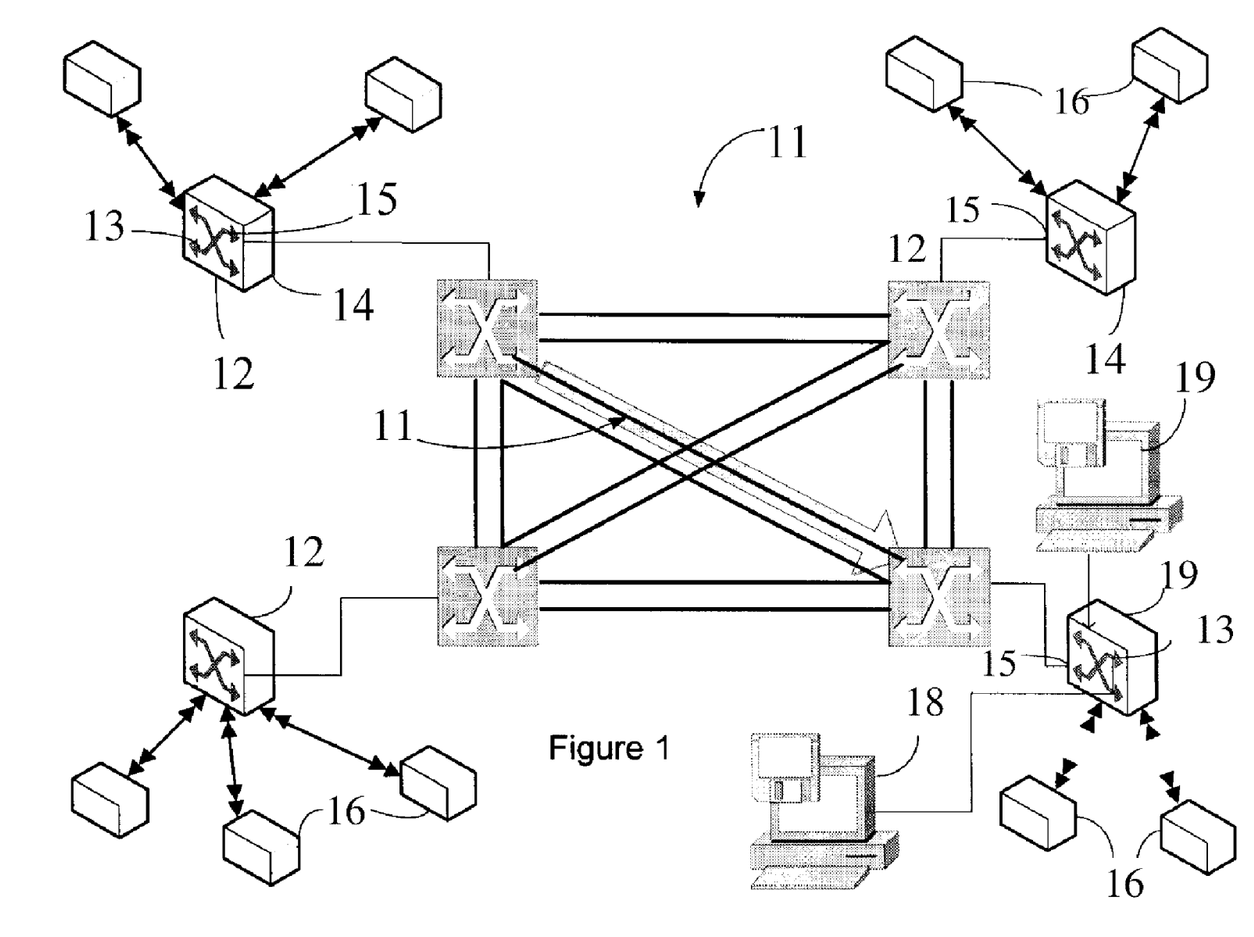
FIG. 1 is a schematic illustration of a telecommunications network constructed and operative in accordance with one exemplary embodiment of the present invention.

A proposed architecture for a telecommunications network constructed and operative in accordance with one exemplary embodiment of the present invention is illustrated schematically in FIG. 1. According to this embodiment, the architecture includes a core network 10 of an arbitrary topology that is surrounded by and coupled to a plurality of edge switching devices 12, each coupled to at least one customer 16. Several trunks 11 pass through the network. A trunk 11 consists of a set of flows between two switching devices that all follow the same path, which consists of a set of links 19 in the network. Thus, in this embodiment, the trunks form a higher level in the hierarchy and the flows inside each trunk form a lower level. It will be appreciated that a core network is not essential for implementation of the present invention. For example, in a minimal network, the edge devices may be connected to one another and, generally, form the network, so there is no need for a separate core network. However, in order to present the hierarchy most clearly, the network is illustrated as including several layers. One example is core and edge layers in a network, as shown in this exemplary embodiment. It will be appreciated that the core network may be virtual, e.g., implemented as a guaranteed bandwidth slice of a TDM network.

Edge devices 12 are configurable switching devices of any desired construction, each having at least one ingress port 13 and one egress port 15. At least one, and possibly all, of the edge devices 12 includes a processor 14, and software (e.g., computer instructions stored on a computer-readable medium), described in detail below (hereinafter—proprietary edge devices). The processors 14 of these proprietary edge devices collect the statistics of bandwidth demand of each flow whose ingress port is on that edge device. This statistics data is then stored in the edge device. Provisioning tables, indicating the bandwidth guarantees to each flow, are also stored in each of the proprietary edge devices.

Figure 2:
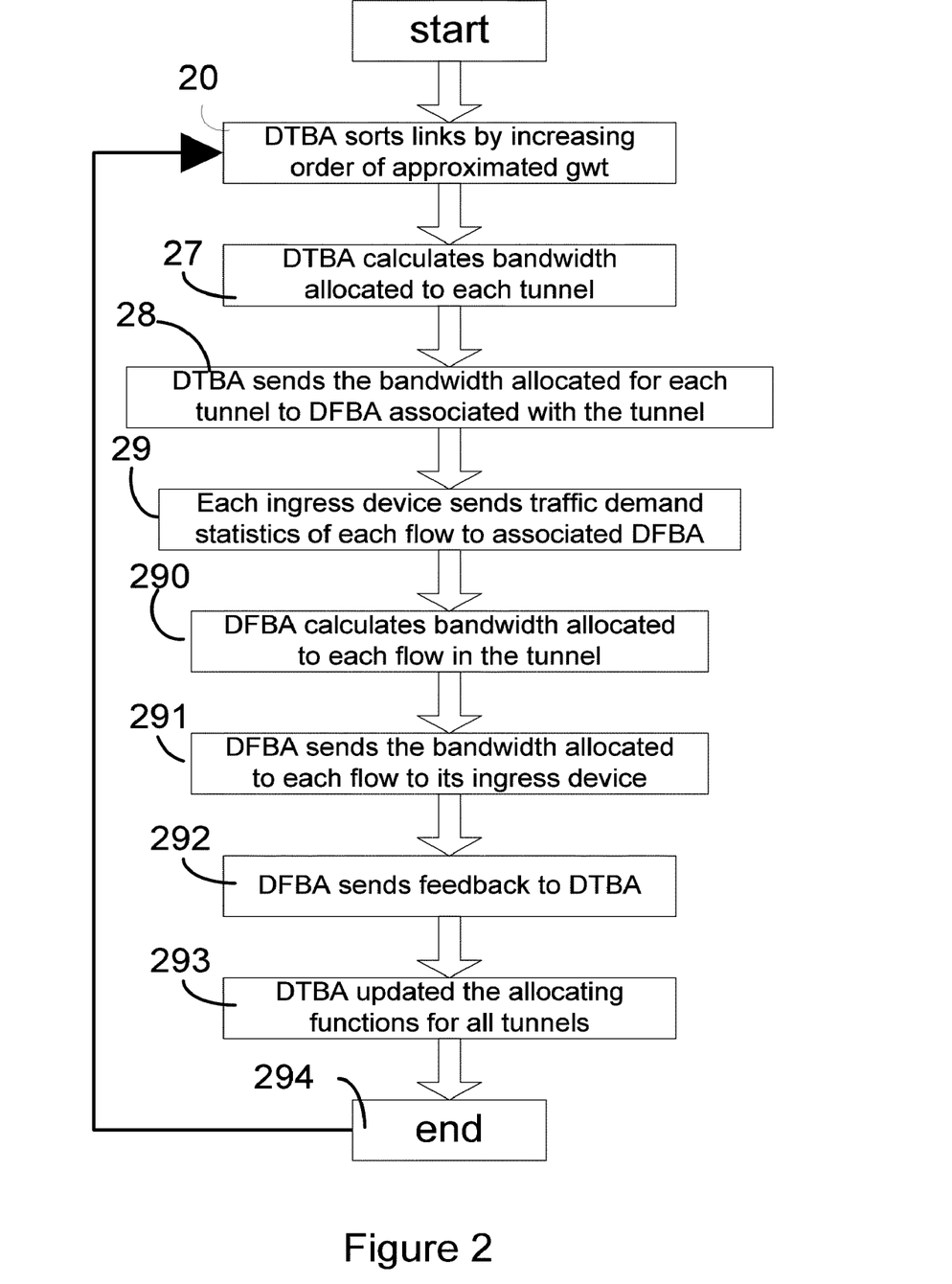
FIG. 2 is a flow chart illustrating an initial dynamic bandwidth allocation (BA) algorithm without a link sorting procedure, according to one exemplary embodiment of the present invention.

Referring now to FIG. 2, there is shown a flow chart illustrating a Bandwidth Allocation (BA) algorithm according to one exemplary embodiment of the invention. The BA algorithm includes two procedures—a Dynamic Trunk Bandwidth Allocation (DTBA) procedure, and a Dynamic Flow Bandwidth Allocation (DFBA) procedure. Each trunk is associated with a DTBA instance. The DTBA procedure sorts the links according to the approximated congestion severity in each link (block 20), here represented by gwt, described in detail below. This DTBA procedure is arranged to perform these calculations on each of the trunks in the network. The DTBA procedure handles each link in order, according to increasing approximate gwt, and calculates bandwidth for each trunk without requiring knowledge of the flows in each trunk (block 27). A bandwidth of a trunk is calculated as follows: a link with maximal congestion severity is found in a trunk path. The amount of bandwidth to be allocated for that trunk on that link is calculated, as described in detail below, and then this amount of bandwidth is [subtracted from the available amount of bandwidth on all other links in the path of that trunk CORRECT? Yes There is no need to calculate the bandwidth allocation for this trunk again on links with lower congestion severity. This means that a bandwidth for a trunk is calculated only once per iteration.

In addition, each trunk is associated with a single instance of a Dynamic Flow Bandwidth Allocation (DFBA) procedure. The DTBA sends the allocated bandwidth of each trunk to the instance of DFBA procedure which is associated with the ingress of that trunk (block 28). For each trunk, the DFBA procedure calculates the bandwidth to be allocated to each flow in the trunk (block 290) and sends the results to the edge device to restrict the granted bandwidth for each flow, accordingly (block 291). Each edge device collects the statistics on bandwidth demand of the flows that start on that device. These statistics are used by the associated instance of the DFBA procedure (block 29) in its calculations. The DTBA builds an allocation function per trunk (block 293), in an iterative process, which is an approximation based on feedback received from the DFBA procedure associated with the ingress device of the trunk (block 292).

Figure 3:
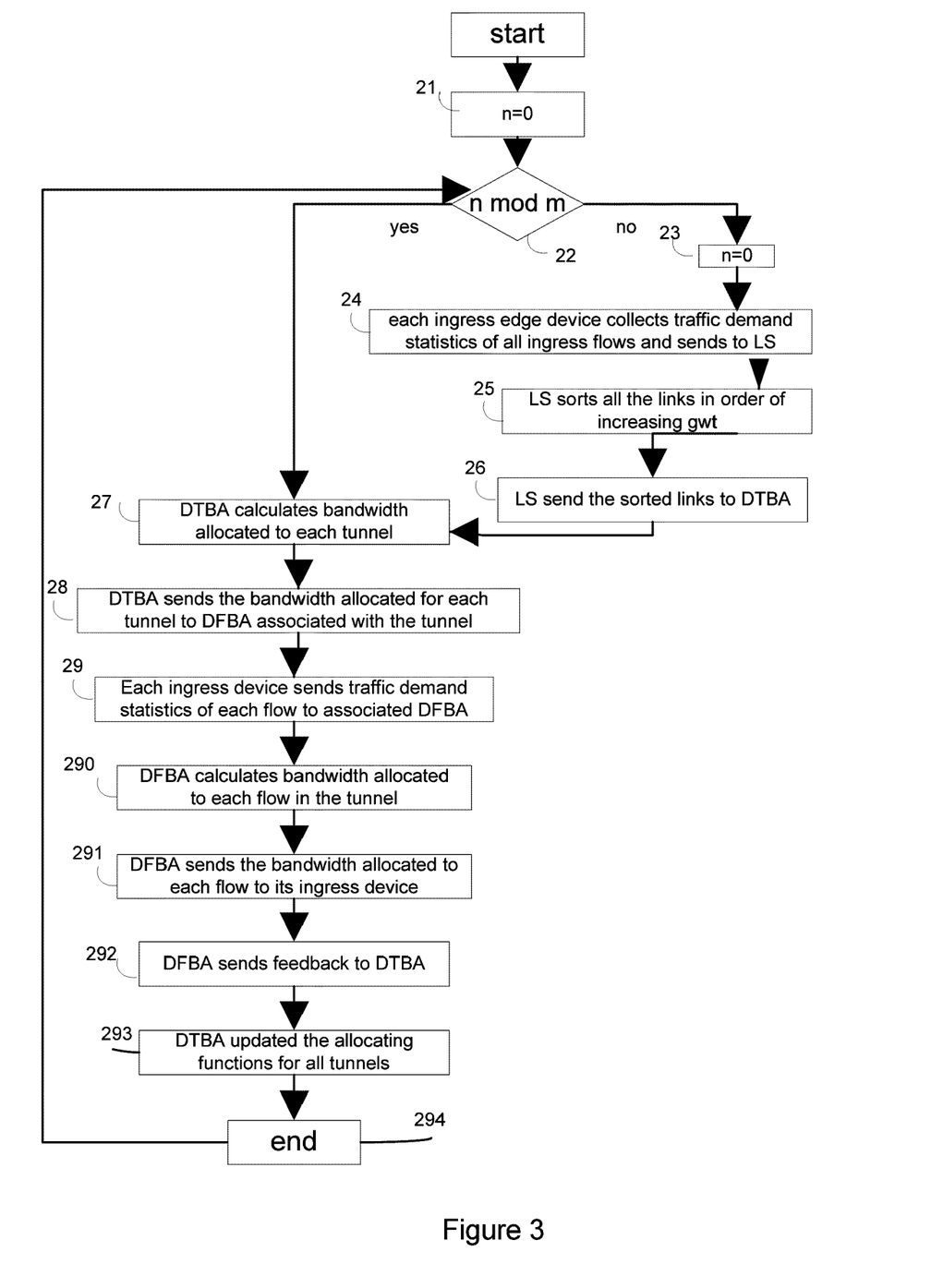
FIG. 3 is a flow chart illustrating an initial dynamic bandwidth allocation algorithm (BA) with a link sorting (LS) procedure, according to one exemplary embodiment of the present invention.

Another Bandwidth Allocation (BA) algorithm according to the present invention is illustrated in FIG. 3. This procedure is similar to that described with reference to FIG. 2, but includes an initial Link Sorting procedure. The link sorting procedure is performed periodically, for example, on each fifth iteration of the algorithm (blocks 21, 22, 23). Each edge device collects the statistics on the flows that start on that device (block 24). The link sorting procedure sorts all links in a network by the congestion severity calculated from the statistics of the flows on that link (block 25), and sends the ordering of links to the Dynamic Trunk Bandwidth Allocation (DTBA) algorithm (block 26). Allocation to the trunks is carried out in the order of the links as sorted by the Link Sorter. The remainder of the method is the same as that described above with reference to FIG. 2. Like operations have like reference numerals.

Thus, when the link order is given to the DTBA by a link sorter procedure, it is based on congestion severity obtained from actual statistics of the flows' traffic. When the BA algorithm has no link sorting procedure, and the link order is calculated by the DTBA procedure, it is based on approximated congestion severity rather than real statistics, so it is less exact and converges slowly. However, the complexity of BA without link sorting is smaller.

The proposed method is based on prior knowledge of traffic SLAs regarding bandwidth consumption. Using this method, the system can limit the bandwidth to various QoS levels according to the SLAs and, thus, achieve fair bandwidth allocations to all traffic flows. The proposed method can dynamically and adaptively cause a change in the demand statistics of the flow to enforce fair bandwidth resource allocation over an entire network, while utilizing fewer resources than would be required to calculate bandwidth allocation for each flow in the network each time.

In the current exemplary embodiment, the dynamic BA algorithm may include three procedures: the Link Sorter (LS), the Dynamic Flow Bandwidth Allocation (DFBA) and the Dynamic Trunk Bandwidth Allocation (DTBA). The BA algorithm preferably runs on each of the proprietary edge devices 12, but it can also run on a single device in the network domain, which can be either a proprietary edge device 12, or a management device 18 (shown in FIG. 1) or other dedicated device.

Another possibility is that the BA algorithm can be a distributive algorithm. This means that each of the three procedures, link sorting, DTBA and DFBA, may run on different devices, which can be the proprietary edge device 12 or a management device 18 or other dedicated device. Moreover, each of the three procedures may have a different number of instances. Each instance of each procedure may be associated with some number of instances of the other procedure. For example, there can be one instance of the link sorting procedure and one instance of DTBA procedure that run on a dedicated device. Moreover, there is an instance of the DFBA procedure that runs on every proprietary edge device in the network.

Figure 4:
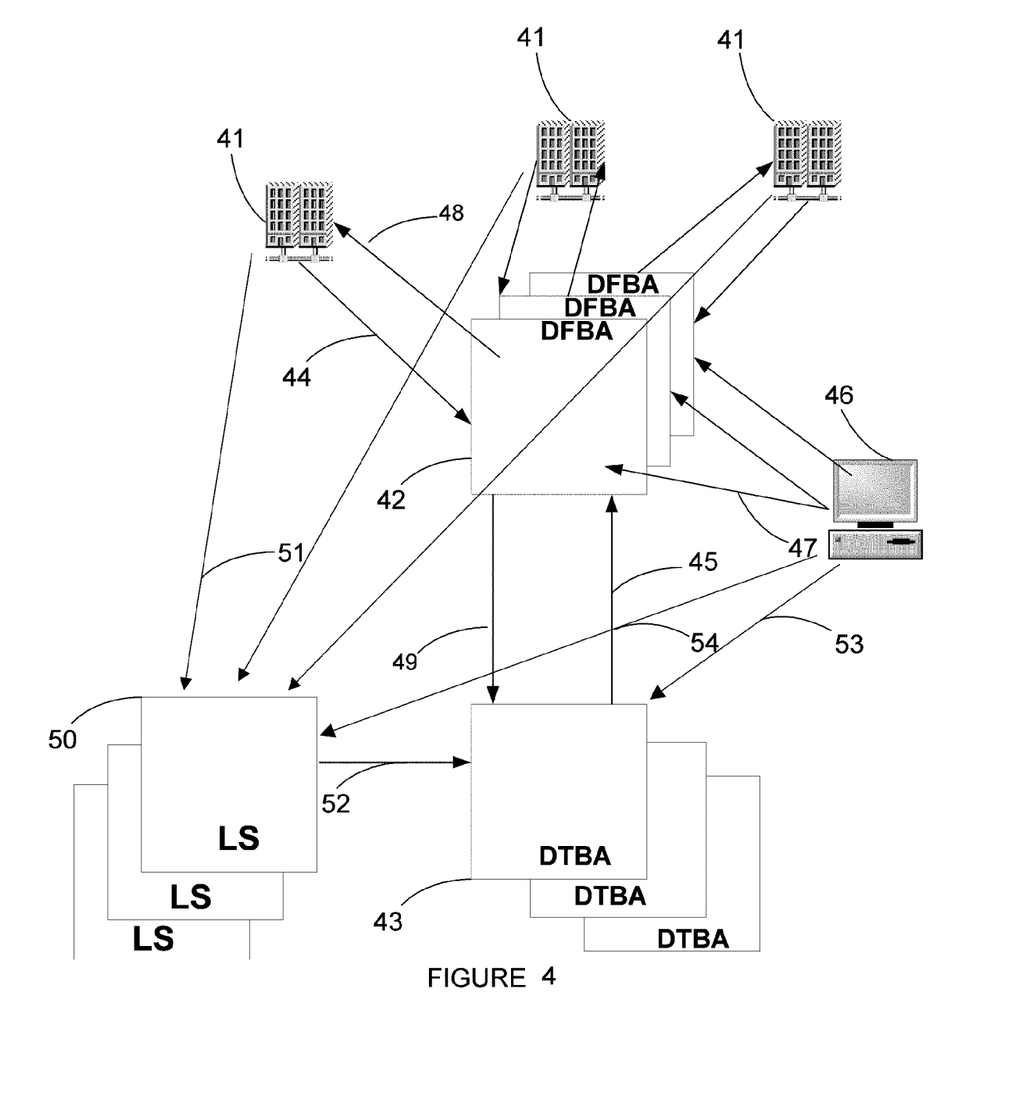
FIG. 4 is a schematic illustration of implementation of a dynamic bandwidth allocation (BA) algorithm in a network, according to a preferred embodiment of the present invention with a distributive implementation.

Referring now to FIG. 4, there is shown a schematic diagram illustrating implementation of a distributed dynamic bandwidth allocation algorithm in a network, according to an exemplary embodiment of the invention, used during normal operation of the network of the invention.

Periodically (preferably several times a second), each edge device 41, which has collected data and/or extrapolated traffic data, sends the data 44 to the appropriate instance of a DFBA procedure 42, preferably running on the same device, and sends the data 51 to the appropriate instance of a link sorting procedure 50, possibly running on a different device. Based on this data and on the most recently updated provisioning tables (in this example, the amount of CIR and EIR for each flow) received 54 from the management unit 46, each link sorting instance sorts the links. The link sorting instance sends 52 the sorted order of links to the DTBA.

The DTBA, based on the links order and on the most recently updated provisioning tables received 53 from the management unit 46, calculates the bandwidth to be allocated for each trunk. The DTBA instance 43 sends 45 the total amount of bandwidth allocated for each trunk to the associated instance of the DFBA algorithm.

Based on this data and on the most recently updated provisioning tables received 47 from the management unit 46, each DFBA instance independently computes the amount of bandwidth to allocate for each flow in each trunk that enters the network through the edge device in the associated trunk.

Then, each DFBA instance sends 48 the allocated bandwidth for each flow to the corresponding edge device. The DTBA estimates the gwt of a link, and then allocates bandwidth to a trunk on a link by an approximated allocation function. In addition, each DFBA instance sends 49 an actual bandwidth that has been allocated for the estimated gwt to the DTBA instance.

It will be appreciated that each of the three procedures: Link Sorting, DTBA, DFBA can be used alone in combination with other bandwidth allocation procedures. Thus, for example, the link sorting procedure of the present invention can also be used in the bandwidth allocation method described in applicant's co-pending U.S. patent application Ser. No. 11/346,147, described above. The DTBA procedure can be utilized with or without the link sorting procedure, and can be used with a different flow allocation procedure.

In order to achieve maximum network resource utilization, generally no packets should be allowed into the network without passing through a proprietary edge device. However, it is possible to utilize these edge devices in a mixed environment with other, non-proprietary edge devices, with degraded results. In the latter case, each non-proprietary edge device is assumed by the proprietary edge devices to utilize the maximum allowed bandwidth it can use, so congestion and traffic loss over the network will be avoided.

Operation of the network according to the present invention is as follows, with reference to an Ethernet packet forwarding network. Each packet entering an edge device is associated with a particular flow (lowest level of the hierarchy) using pre-defined classification rules, according to the service level agreement of the customer for that type of traffic. These classification rules are generally static, although they are updated offline whenever a change in a type or class of service (or bit rate) occurs. First, the total bandwidth allocated for each tunnel is calculated by the DTBA procedure. Once the appropriate flow for the packet has been selected and the bandwidth allocated to its tunnel (the next higher level of the hierarchy), the flow routing and bandwidth allocation are determined by the DFBA procedure of the present invention, running in the edge devices and/or in the central management station. Now, the DFBA allocates bandwidth to all flows in the tunnel.

At the same time, demand statistics of the bandwidth requested by each flow are collected. In addition, statistics concerning the actual allocated bandwidth for each flow are updated. In accordance with exemplary embodiments of the present invention, the packets directed to each flow enter a queue at the proprietary edge device, thereby "throttling" the flow to each given bandwidth. The bandwidth allocated to each flow may change frequently (several times per second) according to the statistics of traffic requesting ingress through the edge device at any given time, taken together with the fixed initial bandwidth allocations and collected traffic statistics (while making sure not to overload the network).

Once the bandwidth has been allocated to the flows, switching occurs and the packet is directed to one or more appropriate outgoing ports, for transmission through the network. In addition, the packet is encapsulated according to the tunneling protocol, or the appropriate protocol for the next higher level of the hierarchy, if it is not an Ethernet network. It will be appreciated that, since the flows are throttled, the total packets bandwidth that is directed to any outgoing port is guaranteed not to exceed the bandwidth capacity of the port.

After entering the network, the packet is directed along its pre-defined path, which corresponds to an associated trunk, until it leaves the network through an appropriate proprietary edge device. Here, too, the packet is classified and associated with a particular flow.

Optionally data on the allocated bandwidth of the flow are collected and statistics concerning the actual and attempted bandwidth consumption for that flow are updated and sent to the edge devices or management station, for control purposes, such as verifying zero frame loss and delay guarantees. Now the packet is switched to one or more appropriate outgoing ports leading outside the network for transmission to one or more customers.

It will be appreciated that, since sufficient resources were allocated over the entire flow (end to end over one or more links) at the time the traffic entered the network, the total packets bandwidth (the rate of incoming packets) that is directed to any network ingress port is known in advance and is guaranteed not to exceed the bandwidth capacity of that port.

The movement of packets throughout the network may be controlled by any generic routing protocol. As flows are added or removed in the network, or change their source or destination and/or their QoS requirements, all the affected edge devices and core network nodes must be informed of the change, and the provisioning tables must be updated substantially simultaneously to reconfigure the network. It is a particular feature of the invention that the optimized provisioning scheme for a given set of flows over a given network provided by the algorithms of the invention will ensure that all committed bandwidth (here illustrated as CIR (Committed Information Rate)) flow requirements can be met and that excess network capacity is "fairly" distributed between all best effort bandwidth (here illustrated as EIR (Excess Information Rate)) flow requirements. In order to quantify the "fair" distribution of EIR bandwidth, an EIR weight may be assigned to each flow bandwidth profile, and the EIR distribution between flows may be according to weight distribution. In one embodiment, all the flows may have the same unit weight. Computing such an optimal bandwidth resource allocation can be accomplished using any of several well-known optimization techniques, such as constraint based algorithms.

Figure 5:
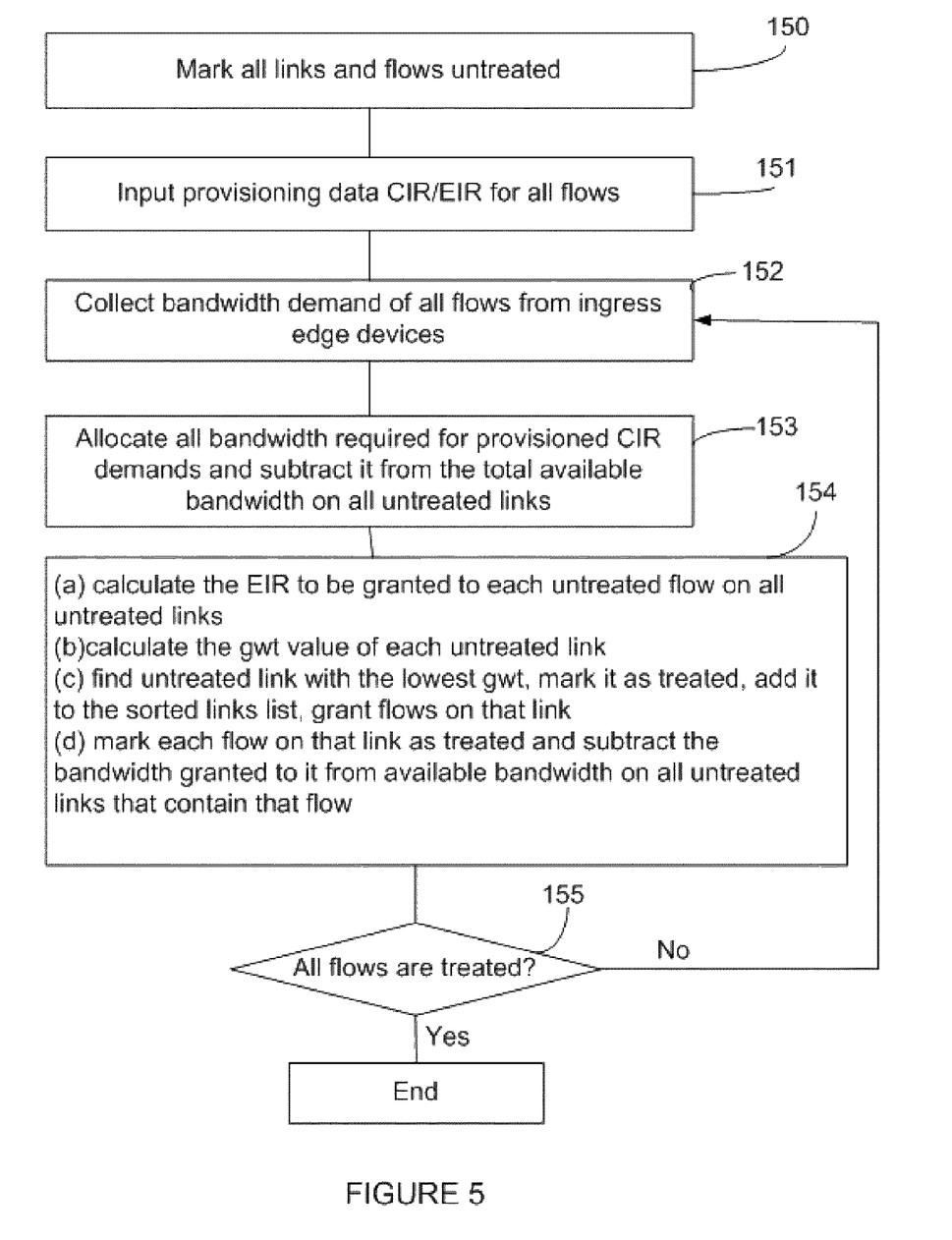
FIG. 5 is a flow chart illustrating an initial link sorting (LS) and configuration change procedure, according to one exemplary embodiment of the present invention.

An example of a fundamental Links Sorting procedure, according to one embodiment of the invention, is illustrated in FIG. 5. The link sorting procedure of the present invention calculates a granted weighted threshold (gwt) (which is a multiplicative inverse of congestion severity) on the links. The gwt of a link is defined as $$\max\left(\frac{granted_i}{weight_i}\right)$$

over all flows i on the link, where $weight_i$ is the EIR weight of the flow i and $granted_i$ is the amount of EIR bandwidth granted to the flow $$i\left(granted_i = \min\left(requested_i, \frac{available * weight_i}{W}\right)\right),$$

where W is the sum of weights of untreated flows in the trunk. The link sorting procedure sorts the links in increasing order of their gwt value and provides the list of sorted links to the DTBA procedure.

As an initial step, all flows and links are marked as untreated (block 150). The provisioning data, which includes physical details and CIR/EIR of all the flows, is input to the link sorting procedure (block 151). Another input to the link sorting procedure is the traffic demand of the various flows. This data is collected from all ingress edge devices (block 152). First, all bandwidth that is required for provisioned CIR is allocated and this amount is subtracted from the total available bandwidth on all untreated links (block 153). Then, the following steps are performed (block 154):

(a) Calculate the EIR to be granted to each untreated link.
(b) Calculate the gwt value of each untreated link.
(c) Find the untreated link having the lowest gwt, mark it as treated, add it to the sorted links list, and grant EIR and CIR bandwidth to each of the flows on that link.
(d) Mark each flow on that link as treated and subtract the bandwidth granted to it from the available bandwidth on all untreated links that contain that flow. These steps (blocks 152 to 154) are carried out iteratively until all the flows have been treated (block 155).

The total available bandwidth allocated for the trunk is calculated by the DTBA procedure and is passed as an input to the DFBA procedure. If the link sorting procedure exists, then link sorting provides the order of the links according to increasing value of gwt to the DTBA. Otherwise, the DTBA sorts the links itself, according to the increasing order of the approximated gwt.

The DTBA handles each link separately. For each link, the DTBA calculates the bandwidth to be allocated to each of the trunks on the link. After a bandwidth of a trunk is calculated on a link with minimal gwt that is contained in a trunk path, this amount of bandwidth is subtracted from all other links in the path of the trunk. There is no need to calculate bandwidth for this trunk again on links with higher gwt. This means that a bandwidth for a trunk is calculated only once. The DTBA procedure is not aware of the actual bandwidth demand of the various flows, but approximates the gwt on the links.

After each approximation, feedback is received from the DFBA instance indicating the actual allocated bandwidth. The DFBA procedure is aware of the bandwidth demands of the flows through its edge device, and the associated trunk of each flow. This feedback should be utilized by the algorithm, so that the next iteration gives results closer to the correct ones. This feedback contains data indicating how much EIR should be granted to a trunk in order for a given gwt to be achieved. The DTBA procedure converges by iteratively dynamically building, in real time, an allocating function per trunk that translates gwt to the bandwidth granted to the trunk ($granted_{trunk}$).

Figure 6:
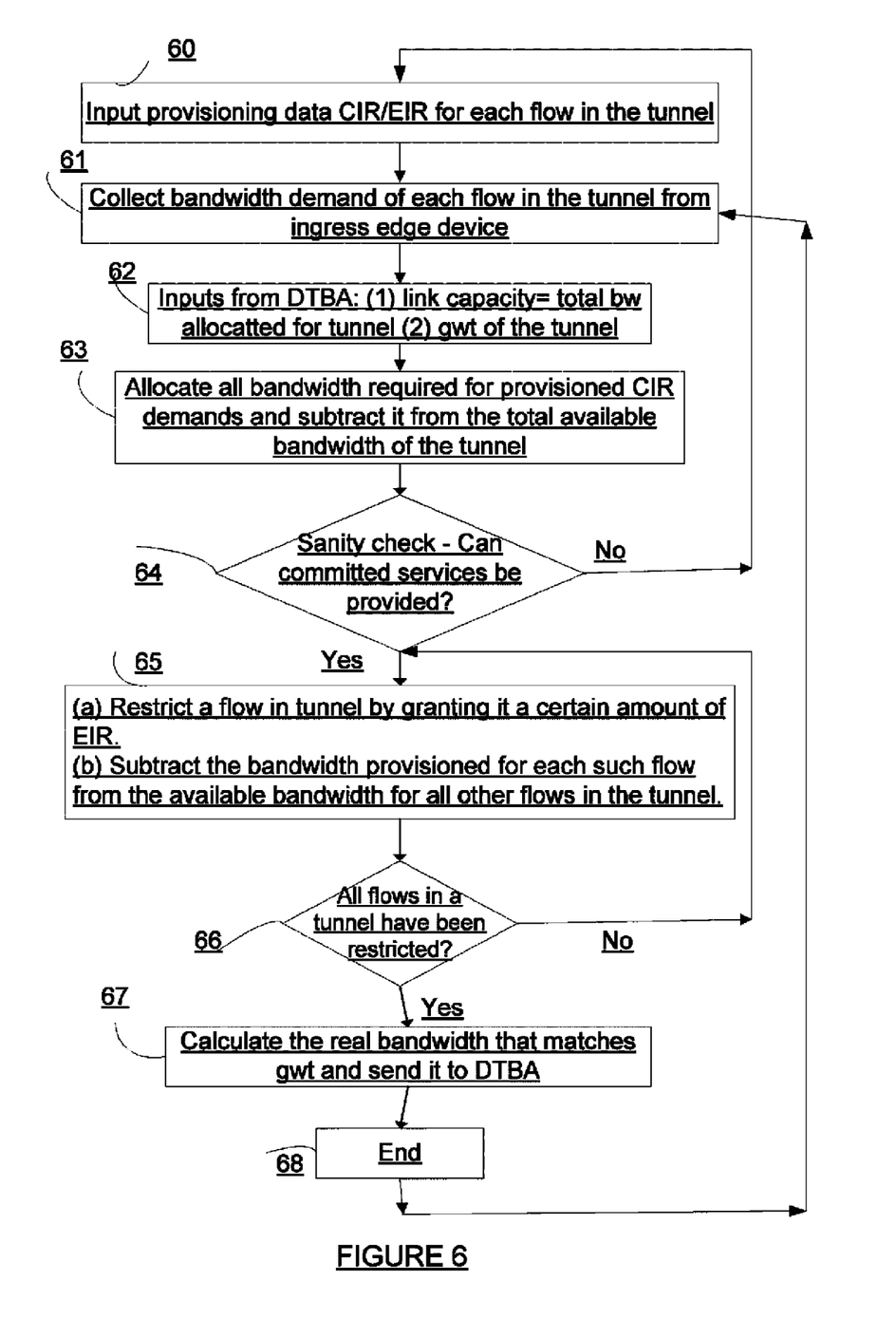
FIG. 6 is a flow chart illustrating an initial dynamic flow bandwidth allocation (DFBA) and configuration change procedure, according to one exemplary embodiment of the present invention.

The network is assumed to be not configured, but it is a prerequisite that the network operator knows the network parameters as detailed hereunder and the required services and/or logical links. The initial bandwidth allocation includes several processes designed to allow the network to start operating in a stable and efficient way from point zero. Thus, an initial division into flows and trunks is provided for the start of operation of the network. One example of a fundamental Dynamic Flow Bandwidth Allocation algorithm for use in providing an initial provisioning scheme for the network and during reconfiguration is illustrated in FIG. 6.

Details of the various classes of service provided to each customer are input into the management device's software (e.g., via a user interface including, e.g., an input device such as a keyboard, a mouse, and/or a graphical user interface), which distributes it to the necessary edge devices, or are input directly into one or more edge devices. Then, this input provisioning data, particularly CIR and EIR, for each flow in its associated trunk is provided to each instance of the DFBA procedure (block 60).

The bandwidth demands of each flow in the trunk are collected by the ingress edge device and also passed to the instance of the DFBA procedure (block 61).

The total available bandwidth allocated for the trunk is calculated by the DTBA procedure (explained in detail with reference to FIG. 7, below) and is received as an input to the DFBA procedure (block 62). In addition, an approximated gwt is passed from the DTBA to the DFBA.

The DFBA procedure allocates all bandwidth required for provisioned CIR demands of the flows in its trunk and subtracts this bandwidth from the total available bandwidth of the trunk (block 63).

The DFBA procedure now performs a "sanity check" (block 64), i.e., it verifies that all the services can be provided within the available bandwidth of the trunk (e.g., that the sum of CIR traffic at any link is no greater than the maximum permitted bandwidth). If the sanity check is not passed, the user is informed and corrected provisioning CIR/EIR data (block 60) must be input to the algorithm.

Once the sanity check is passed, the following steps are carried out (block 65): Each flow in the trunk is restricted, in turn, by granting it a certain amount of EIR. This can be accomplished as follows.

(a) Set $requested_i$ as the bandwidth demand of flow i above its provisioned CIR and set $weight_i$ as the EIR weight of the flow. Find flow i such that $$\frac{requested_i}{weight_i}$$

is minimal.

(b) Set available as the available bandwidth on the trunk that was not allocated yet. All flows in the trunk are restricted in a fair manner, i.e., to each flow i, the following EIR bandwidth is granted:

$$granted_i = \min\left(requested_i, \frac{available * weight_i}{W}\right),$$

where W is the sum of weights of untreated flows in the trunk.

The bandwidth allocated for each such flow is now subtracted from the remaining available trunk bandwidth, i.e., available is decreased by the amount of allocated bandwidth of flow i.

These steps are repeated until all the flows in the trunk have been considered and all the flows have been restricted (block 66).

Then the DFBA procedure calculates the total bandwidth that should be allocated to all the flows in the trunk while using the gwt received from DTBA (i.e., the actual bandwidth that corresponds to this gwt), and sends this value to the DTBA procedure (block 67). Once this has been accomplished, this iteration of the algorithm ends (block 68), and the system begins to operate using this bandwidth allocation scheme. A next iteration is started periodically after a lapse of a fixed, pre-defined period of time.

Figure 7:
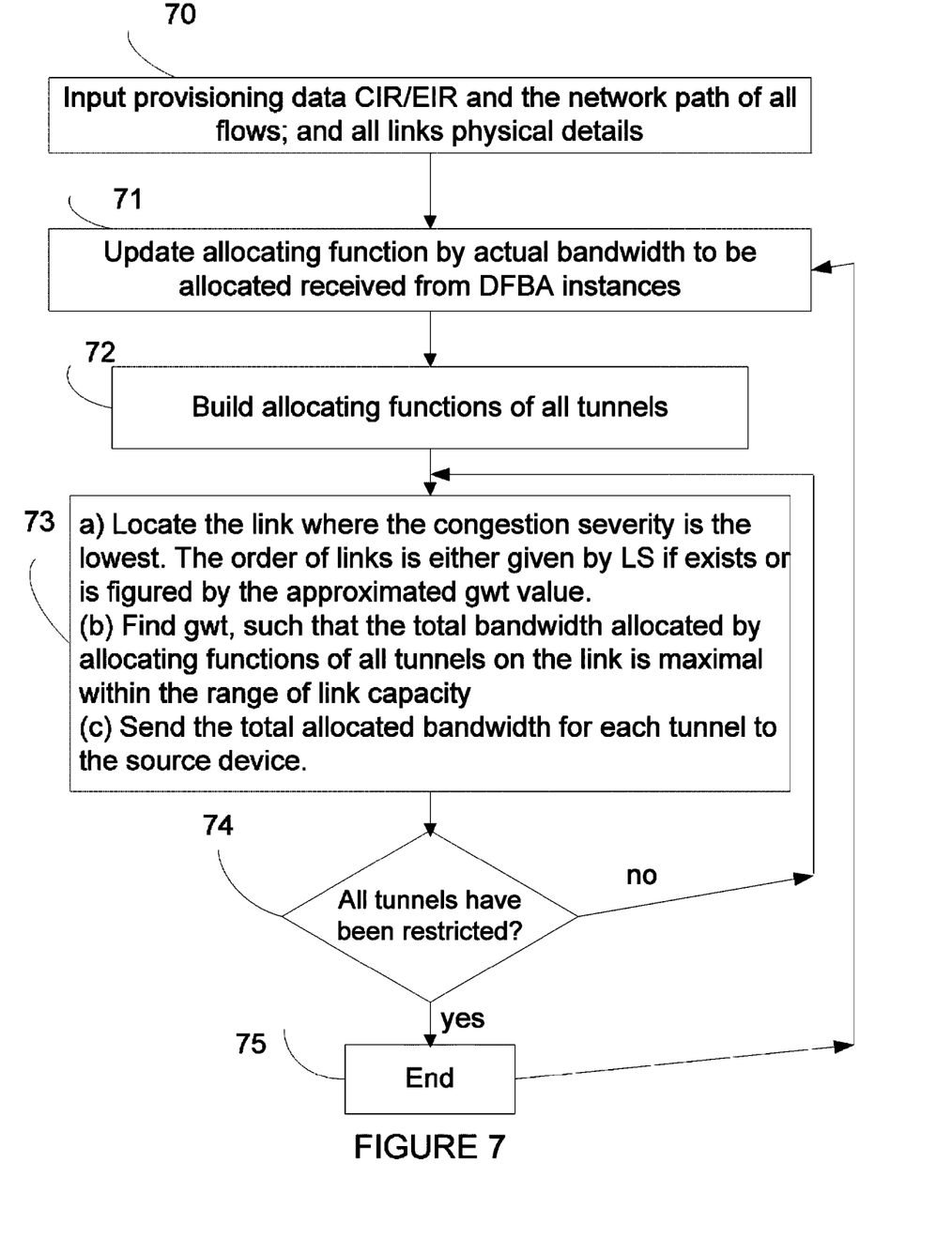
FIG. 7 is a flow chart illustrating an initial dynamic tunnel bandwidth allocation (DTBA) and configuration change procedure, according to one exemplary embodiment of the present invention.

An example of a fundamental Dynamic Trunk Bandwidth Allocation procedure, according to one exemplary embodiment of the invention, for use in providing an initial provisioning scheme for the network and during reconfiguration is illustrated in FIG. 7. Provisioning data, which includes physical details and CIR/EIR of all links and the network paths of all the flows in the network through their associated trunks, is input to the DTBA procedure (block 70).

The DTBA algorithm maintains an allocating function GRANTED, (gwt) for each trunk. The $GRANTED_t$(gwt) function maps gwt of a trunk t (which is the gwt of the most congested link in a trunk) to the bandwidth to be granted for that trunk. The $GRANTED_t$(gwt) function is built incrementally (block 72) as follows. As an initial step, the $GRANTED_t$ (gwt) function is estimated. During each iteration, the gwt of the trunk is sent to the instance of the DFBA algorithm that allocates bandwidth to the flows on the ingress device. The instance of the DFBA procedure calculates the actual CIR and EIR bandwidths that should be allocated for this value of gwt and sends these values back to the DTBA. Upon receiving the actual bandwidth, the DTBA procedure updates the $GRANTED_t$(gwt) function (block 71), accordingly. Thus, a corresponding function for each trunk t is updated, such that the overall bandwidth granted for all trunks is as close as possible to the physical link capacity. Granting bandwidth to each trunk is accomplished by calculating $GRANTED_t(gwt_t)$ for each trunk. The remainder of the available bandwidth is defined by R and is, therefore, minimal, since $$R = \left(\sum_i GRANTED_t(gwt_t) - \text{link capacity}\right).$$

The $gwt_t$ is found iteratively, while initially, the $gwt_t$ value is random. During each iteration, the value R is calculated. If R is not small enough, the $gwt_t$ is increased by some delta, which may also be negative. When R changes sign, then the delta is decreased. The iterative process stops when either R is small enough or a certain number of iterations have already been performed.

Then, the following three steps are repeated (block 73):

(a) Locate the untreated physical link with the lowest gwt (highest congestion severity) in the order provided by the link sorting function or by the approximated gwt values.

(b) For all trunks on that link, compute gwt of each defined period of time.

(c) Calculate granted bandwidth per trunk by $GRANTED_t$ ($gwt_t$) and send the total allocated bandwidth for trunk t to the appropriate instance of the DFBA algorithm.

These three steps are repeated until all the trunks have been considered and restricted (block 74) and this iteration of the algorithm ends (block 75). A next iteration is started periodically after a lapse of a fixed, pre-defined period of time.

Each GRANTED$_t$(gwt) function is used and updated as follows.

The valid gwt range is divided into a configured number of discrete values. When GRANTED$_t$(gwt) is requested, the gwt is mapped to the closest discrete value in the function range and the appropriate granted value is retrieved. When an actual granted value is received from a DFBA algorithm for the given gwt, the GRANTED$_t$(gwt) is updated. Again, the gwt is mapped, to the closest discrete value in the function range, and the appropriate granted value is updated. However, in order for the algorithm to converge, the GRANTED$_t$(gwt) function should be monotonic. Therefore, each time a granted value is updated, the monotonicity should be preserved. Also, the convergence time of the algorithm is faster if two close gwt values are updated each time in the function, instead of only one, since then the function is fixed more precisely.

According to one exemplary embodiment of the invention, the method can be deployed in a hierarchical Provider Backbone Bridged Network (PBBN). In such a network, there are levels of trunks (the higher hierarchical level), and each trunk aggregates a set of services inside (the lower hierarchical level). The bandwidth allocation between the trunks is performed on one level of admission control, while the bandwidth allocation of services inside each trunk is implemented on another level of admission control.

Another example is a Transport Multi Protocol Label Switching (T-MPLS) layer network. The T-MPLS layer network provides the transport of information through a T-MPLS trail between T-MPLS access points. Here, also, the bandwidth allocation for each trail (the higher hierarchical level) can be performed on one level of admission control. The bandwidth allocation of services inside each trail (the lower hierarchical level) can be done on another level of admission control.

It will further be appreciated that the method of the present invention is useful not only in simple, single network hierarchical telecommunication networks, but can also be used for transmission of packets over several networks, which may be heterogeneous.

While the present invention has been described with respect to a limited number of embodiments, it will be appreciated that many variations, modifications and other applications of the present invention may be made. It will further be appreciated that the present invention is not limited to what has been described hereinabove merely by way of example. Rather, the invention is limited solely by the claims which follow.

The invention claimed is:

1. A method for bandwidth allocation over a hierarchical telecommunications network having a first hierarchical level of at least two trunks and a second hierarchical level of at least two flows in each trunk, the method comprising:
   forming a network including at least two edge devices coupled by at least two core devices, each said core device being without per flow admission control capability, over at least one physical link and a plurality of flows over each said link, each flow having a defined physical connection scheme;
   providing knowledge of global network topology and network utilization to a processor in said network outside of said core devices;
   allocating bandwidth to each of the trunks, by said processor utilizing said knowledge; and
   separately allocating to the flows in each said trunk, by a processor in the network outside of said core devices, said bandwidth allocated to that trunk;
   further comprising the steps of:
   before said step of allocating to said trunks, providing a sorted order of trunks by sorting links of all trunks according to congestion severity of each link; and
   said step of allocating bandwidth to said trunks includes allocating bandwidth to each trunk in said sorted order.

2. The method according to claim 1, wherein said step of allocating bandwidth to each of the trunks includes:
   allocating Committed Information Rate (CIR) bandwidth, in accordance with input provisioning data;
   calculating a difference between total available bandwidth and said CIR bandwidth; and
   allocating said difference as Excess Information Rate (EIR) bandwidth in accordance with provisioning data.

3. The method according to claim 2, wherein said step of calculating includes iterative calculation of said bandwidth allocation.

4. The method according to claim 3, further comprising, in every iteration:
   calculating the allocation to the flows utilizing said allocation to the trunks; and
   calculating a next allocation to the trunk utilizing the bandwidth actually allocated to the flows.

5. The method according to claim 1, wherein said step of providing a sorted order includes determining an approximate value of a granted weighted threshold (gwt), which is inversely related to congestion severity, in each link.

6. The method according to claim 5, wherein said gwt of a link is defined as $$\max\left(\frac{granted_i}{weight_i}\right)$$

over all flows i on the link, where weight$_i$ is an EIR weight of the flow i and granted$_i$ is an amount of EIR bandwidth granted to the flow $$i\left(granted_i = \min\left(requested_i, \frac{available * weight_i}{W}\right)\right),$$

where W is the sum of weights of untreated flows in the trunk.

7. The method according to claim 6, wherein said step of determining an approximate value includes iteratively dynamically building, in real time, an allocating function per trunk that translates said granted weighted threshold (gwt) to the bandwidth granted to the trunk (granted$_{trunk}$).

8. The method according to claim 1, wherein said step of providing a sorted order includes calculating values of a granted weighted threshold (gwt), which is inversely related to congestion severity, in each link.

9. The method according to claim 1, wherein said step of allocation to said flows includes:
   allocating CIR to each flow in the trunk; and
   restricting each flow in the trunk by granting it an amount of EIR proportional to at least one selected from the group consisting of: provisioned best effort bandwidth, weight, and priority.

10. The method according to claim 1, wherein the network is a packet switching network, and said step of allocating bandwidth to trunks includes allocating bandwidth to packet trunks, and said step of allocating bandwidth to flows includes allocating bandwidth to flows inside each trunk.

11. The method according to claim 1, wherein the network is a MPLS-TP layer network, and said step of allocating bandwidth to trunks includes allocating bandwidth to MPLS-TP trails, and said step of allocating bandwidth to flows includes allocating bandwidth to services inside each trail.

12. The method according to claim 1, wherein the network is a PBB/PBB-TE network, and said step of allocating bandwidth to trunks includes allocating to bandwidth PBB/PBB-TE trunks, and said step of allocating bandwidth to flows includes allocating bandwidth to services inside each trunk.

13. The method according to claim 1,
wherein said step of providing a sorted order of trunks includes providing a sorted order of trunks according to estimated congestion severity of each link.

14. A method for bandwidth allocation over a hierarchical telecommunications network having a first hierarchical level of at least two trunks and a second hierarchical level of at least two flows in each trunk, the method comprising:
forming a network including at least two edge devices coupled by at least two core devices, each said core device being without per flow admission control capability, over at least one physical link and a plurality of flows over each said link, each flow having a defined physical connection scheme;
providing knowledge of global network topology and network utilization to a processor in said network outside of said core devices;
allocating bandwidth to each of the trunks, by said processor utilizing said knowledge; and
separately allocating to the flows in each said trunk, by a processor in the network outside of said core devices, said bandwidth allocated to that trunk;
wherein said step of allocation to said flows includes:
allocating CIR to each flow in the trunk; and
restricting each flow in the trunk by granting it an amount of EIR proportional to provisioned best effort bandwidth and or weight and or priority;
and wherein said step of restricting includes:
(a) setting requested$_i$ as a bandwidth demand of flow i above its provisioned CIR and set weight as an EIR weight of the flow;
(b) finding flow i such that $$\frac{requested_i}{weight_i}$$

is minimal;
(c) setting available as available bandwidth on the trunk that was not allocated yet;
(d) granting to each flow I in the trunk the following EIR bandwidth:

$$granted_i = \min\left(requested_i, \frac{available * weight_i}{W}\right),$$

where W is a sum of weights of untreated flows in the trunk, and wherein said step of restricting includes:
(a) setting requested$_i$ as a bandwidth demand of flow i above its provisioned CIR and set weight as an EIR weight of the flow;
(b) finding flow i such that $$\frac{requested_i}{weight_i}$$

is minimal;
(c) setting available as available bandwidth on the trunk that was not allocated yet;
(d) granting to each flow I in the trunk the following EIR bandwidth:

$$granted_i = \min\left(requested_i, \frac{available * weight_i}{W}\right),$$

where W is a sum of weights of untreated flows in the trunk.

15. A method for bandwidth allocation over a hierarchical telecommunications network having a first hierarchical level of at least two trunks and a second hierarchical level of at least two flows on links in each trunk, the method comprising:
a. forming a network including at least two edge devices coupled by at least two core devices, each said core device being without per flow admission control capability, over at least one physical link and a plurality of flows over each said link, each flow having a defined physical connection scheme;
b. providing knowledge of global network topology and network utilization to a processor in said network outside of said core devices;
c. determining, in said processor, a value of a granted weighted threshold (gwt) which is inversely related to congestion severity, in each link;
d. sorting said links in order based on said values of gwt;
e. in said sorted links order, calculating in said processor a bandwidth to be allocated to each trunk, based on said knowledge and on provisioned CIR and EIR for each trunk and/or for flows thereof, actual traffic bandwidth demands of each flow and the bandwidth allocations granted for each flow;
f. based on said allocated bandwidth, on provisioned CIR and EIR for each flow and actual identified traffic bandwidth demands of each flow and the bandwidth allocations granted for each flow, independently computing in a processor in the network outside of said core devices an amount of bandwidth from said bandwidth allocated to each trunk to allocate for each flow in each trunk;
g. sending said allocated bandwidth for each flow to a corresponding edge device to permit per flow ingress of data traffic over said allocated bandwidth only;
h. updating statistics in said processor which allocates to each trunk of actual identified traffic bandwidth demands of each flow and the bandwidth allocations granted for each flow; and
i. repeating steps b. to h.

16. The method according to claim 15, wherein the step of determining includes calculating gwt utilizing actual statistics of said flows.

17. The method according to claim 15, wherein the step of determining includes iteratively dynamically building, in real time, an allocating function per trunk that translates said granted weighted threshold (gwt) to the bandwidth granted to the trunk (granted$_{trunk}$).

18. The method according to claim 15, wherein said step of allocating bandwidth to each trunk includes:
inputting provisioning data including CIR and EIR for each flow in said trunk;

collecting an actual bandwidth demand of each flow in the trunk;
allocating all bandwidth for provisioned CIR and subtracting it from total available bandwidth;
restricting each flow in said trunk by granting it some EIR; and
calculating a bandwidth for said trunk.

19. The method according to claim 15, wherein said method for allocating bandwidth to each flow includes:
inputting provisioning data including CIR and EIR for each flow in said trunk;
collecting an actual bandwidth demand of each flow in the trunk;
allocating all bandwidth for provisioned CIR and subtracting it from total available bandwidth;
calculating EIR to be granted to each flow by:
  a. determining a gwt value of each untreated link;
  b. granting EIR to each untreated flow on a link having a lowest gwt;
  c. marking said flows as treated and subtracting said granted bandwidth from available bandwidth for untreated links; and
  d. repeating steps a. to c. until all flows are marked treated.

20. A system for bandwidth allocation over a hierarchical packet switching network having at least two trunks and at least two flows in each trunk, the system comprising:
at least two edge devices, each having at least one ingress port and at least one egress port, coupled by at least two core devices, each said core device being without per flow admission control capability, over at least one physical link and a plurality of flows over each said link, each flow having a defined physical connection scheme;
each edge device being coupled to a processor in said network, outside of said core devices, for sending information regarding bandwidth demand through that device to said processor;
said processor arranged for receiving said information and allocating bandwidth to each trunk in the network utilizing said knowledge; and
a processor in said network outside of said core devices for separately allocating to the flows in each said trunk the bandwidth allocated to that trunk;
further comprising a link sorter for calculating a granted weighted threshold (gwt) which is inversely related to congestion severity, of each link and providing a list of links sorted according to link congestion.

* * * * *